UNITED STATES PATENT OFFICE.

CARL SUNDSTROM, OF DETROIT, MICHIGAN, ASSIGNOR TO THE SOLVAY PROCESS COMPANY, OF SOLVAY, NEW YORK, A CORPORATION OF NEW YORK.

PROCESS OF RECOVERING CONSTITUENTS OF VALUE FROM NATURAL ALKALINE DEPOSITS.

1,349,445.   Specification of Letters Patent.   Patented Aug. 10, 1920.

No Drawing.   Application filed October 16, 1918. Serial No. 258,459.

*To all whom it may concern:*

Be it known that I, CARL SUNDSTROM, a citizen of the United States, residing at Detroit, in the county of Wayne and State of Michigan, have invented a new and Improved Process of Recovering Constituents of Value from Natural Alkaline Deposits, of which the following is a specification.

My invention relates to the treatment of alkaline deposits such as the brine of Searles Lake in California, which contains sodium chlorid, sodium sulfate, sodium carbonate, sodium tetroborate and potassium chlorid, and the object of my improvements is to provide an economical and efficient method of recovering the potassium chlorid and other contents of value of such brines in a commercially pure state.

As is well known a considerable proportion of the sodium sulfate content of such brines can be removed by chilling the brine to a temperature of zero centigrade such chilling however does not cause precipitation of the sodium carbonate or borax and the presence of these is a source of difficulty in the final vacuum pan evaporation in processes directed to the recovery of the potassium chlorid, the former by forming a scale on the heating pipes whereby the transmission of heat is minimized and the latter by contaminating the crystallized potassium chlorid product.

The object of my improvements is to obviate these difficulties and my invention is based upon the fact, which I have discovered, that if the brine be chilled in the first instance to a point materially below zero centigrade, not only is a more complete precipitation of the sodium sulfate effected but also the sodium carbonate and borax are thrown down to such an extent that they are not present in sufficient quantity in the later stages of the process to interfere with its operation or to contaminate the potassium chlorid product. Their preliminary removal in this manner also enables the recovery of sodium chlorid in a commercially pure state which has not heretofore been possible and an appreciable increase in concentration is obtained by the separation of water as water of crystallization in the precipitated salts.

In carrying my invention into effect I first chill the brine to a low temperature, that which I find most suitable being —14° C., though I do not limit my invention to the use of this exact temperature. By such chilling about two thirds of the borax and sodium carbonate and 80 to 90 per cent. of the sodium sulfate are precipitated and concentration of potassium chlorid is increased 20 to 25 per cent. without evaporation. Such extreme chilling precludes natural refrigeration in localities where such temperatures prevail as in the vicinity of Searls Lake and therefore artificial refrigeration must ordinarily be resorted to. This is moreover preferable not only because of its greater intensity but because it can be regulated and controlled and is not subject to the variability of the weather.

The chilling may be effected in cone bottom tanks containing cooling coils inside of which liquid ammonia is evaporating. The precipitated salts settle to the bottom of the cone and are drawn off and separated in the cold from the liquor by means of a filter wheel or other suitable device. The clear liquor is then, if desired, evaporated in solar ponds until just saturated with potassium chlorid when the liquor is drawn off from the precipitated sodium chlorid and other salts. The liquor is then evaporated at a high temperature, preferably in multiple effect evaporators, until saturated with potassium chlorid at the high temperature. The hot liquor is then drawn off from the precipitated salts and is cooled to crystallize out potassium chlorid. Because of the removal of borax in the first instance no borax precipitates out at this point as is usually the case.

The mother liquor from the potassium chlorid can be evaporated for further crops of potassium chlorid at least twice before borax begins to contaminate the crops to any appreciable extent.

During the evaporation sodium chlorid is thrown out at a high temperature and can be recovered 95 per cent. pure which is not the case when sodium carbonate is not removed from the raw brine by extreme chilling.

The salts which are removed at —14° C., from the chilled brine will contain 70 per cent. of the original carbonate as $Na_2CO_3 \cdot 10H_2O$, together with large amounts of hydrated borax and sodium sulfate.

In order to recover the sodium carbonate content the mixed salts are allowed to warm up to about 25° C., which causes them to partially melt.

The liquor contains upward of 100 grams per liter, $Na_2CO_3$, while the solid salts remaining are nearly pure sodium sulfate. The carbonate-containing liquor is filtered from the solid salts at about 25° C., and is then blown with carbon dioxid-containing gas, such as kiln gas, whereby sodium bicarbonate is precipitated which may then be washed, filtered and calcined to yield soda ash.

I do not claim herein the above described method of recovering sodium bicarbonate, but have made the same the subject of a separate application for Letters Patent, filed April 3, 1920, Serial No. 370,966.

Having thus described my invention what I claim as new and desire to secure by Letters Patent is,—

1. The process of recovering potassium chlorid from solutions in which it is contained together with sodium chlorid, sodium sulfate, sodium carbonate and borax, which consists in chilling the solution so as to precipitate sodium sulfate, sodium carbonate and borax and separating out the precipitated salts, evaporating the cleared brine first by solar heat until it is approximately saturated with potassium chlorid and then, after separation from precipitated salts, by artificial heat at a high temperature and without admixture of other salts, until it is saturated with potassium chlorid at the temperature employed, and finally separating the brine from the salts precipitated during the high temperature evaporation and cooling it to crystallize out potassium chlorid.

2. The process of recovering potassium chlorid from solutions in which it is contained together with sodium chlorid, sodium sulfate, sodium carbonate and borax, which consists in chilling the solution to approximately —14° C., so as to precipitate sodium sulfate, sodium carbonate and borax and concentrate the solution by the removal of the water of crystallization in these salts and separating out the precipitated salts, evaporating the cleared brine first by solar heat until it is approximately saturated with potassium chlorid and then, after separation from precipitated salts, by artificial heat at a high temperature and without admixture of other salts, until it is saturated with potassium chlorid at the temperature employed, and finally separating the brine from the salts precipitated during the high temperature evaporation, and cooling it to crystallize out potassium chlorid.

3. The process of recovering potassium chlorid from solutions in which it is contained together with sodium chlorid, sodium sulfate, sodium carbonate and borax, which consists in chilling the solution to approximately —14° C., so as to precipitate sodium sulfate, sodium carbonate and borax and concentrate the solution by the removal of the water of crystallization in these salts, and separating out the precipitated salts, evaporating the cleared brine, without admixture of other salts, at a high temperature until it is saturated with potassium chlorid at the temperature employed and finally separating the brine from the salts precipitated during evaporation, cooling it to crystallize out the potassium chlorid.

In testimony whereof I have affixed my signature this 18th day of September, 1918.

CARL SUNDSTROM.